United States Patent [19]

Mathews et al.

[11] Patent Number: 4,577,301
[45] Date of Patent: Mar. 18, 1986

[54] TRACK PITCH CALIBRATION ERROR REDUCTION

[75] Inventors: Harlan P. Mathews; Craig Cambier, both of Boulder County, Colo.

[73] Assignee: Storage Technology Partners II, Louisville, Colo.

[21] Appl. No.: 628,686

[22] Filed: Jul. 6, 1984

[51] Int. Cl.⁴ ............................................. G11B 7/00
[52] U.S. Cl. ....................................... 369/44; 369/111
[58] Field of Search ................. 369/44, 45, 46, 54, 369/58, 32, 33, 41, 111, 275; 360/77, 78; 365/234, 215; 250/201; 358/342; 346/76 L, 137

[56] References Cited

U.S. PATENT DOCUMENTS

| | | | |
|---|---|---|---|
| 4,138,741 | 2/1979 | Hedlund et al. | 365/234 |
| 4,167,024 | 9/1979 | Hamisch | 369/46 |
| 4,283,777 | 8/1981 | Curry et al. | 365/234 |
| 4,290,122 | 9/1981 | Bates et al. | 365/234 |
| 4,432,083 | 2/1984 | Hsieh et al. | 369/44 |
| 4,504,939 | 3/1985 | Eberly | 369/46 |

*Primary Examiner*—Donald McElheny, Jr.
*Attorney, Agent, or Firm*—Bryant R. Gold; James R. Young

[57] ABSTRACT

A system and method for optically measuring and maintaining track pitch in an optical storage system. A set of at least four calibration tracks, each having a prescribed track pitch or distance therebetween, are precisely placed on a record carrier of the optical storage system during the manufacture thereof. When this record carrier is subsequently inserted into the optical storage system, the track pitch of a select pair of the calibration tracks is optically measured, and an offset signal is generated in response to this measurement. This offset signal is used within the optical storage system for controllably positioning a second radiation beam with respect to a first radiation beam, the first radiation beam being directed to follow a previously written data track on the record carrier. The offset signal may be stored so that it need only be generated during an initialization or calibration mode of the optical storage system, and thereafter be readily available for positioning the second radiation beam relative to the first radiation beam. The select pair of calibration tracks may be an inner pair, having additional tracks adjacent both sides thereof, or an outer pair, having an additional track adjacent only one side thereof; thereby having included in the offset signal the optical effects of having additional data tracks adjacent or not adjacent the respective sides of the pair of calibration tracks whose track pitch is being measured.

16 Claims, 13 Drawing Figures

TRACK PITCH CALIBRATION ERROR REDUCTION

BACKGROUND OF THE INVENTION

The present invention relates to track pitch calibration systems, and more particularly to a track pitch calibration system that may be used in an optical storage system to accurately set and maintain a prescribed track pitch for data tracks placed on a record carrier used within the optical storage system.

An optical disk storage system of the type to which the present invention pertains comprises an optical drive into which a record carrier is inserted. Data is stored by marking the record carrier, such as a rotating disk, with a beam of radiant energy (typically a laser beam) that is modulated in some fashion by the data to be stored. To write or store data on the record carrier, the modulated beam is directed to and focused at a desired point on the surface of the record carrier and relative motion is created between this part and the record carrier. Where the record carrier is a disk, this relative motion is typically created by rotating the disk. As the disk rotates under the desired point, a "data track" is created by the marks made on the disk by the modulated beam. If the desired point at which the beam is focused is held stationary, a circular data track is created on the disk that is centered about the axis of rotation of the rotating disk. Additional data tracks, each concentric with the others, can be created by turning the write beam off, radially moving the point at which the write beam is focused to a new location, holding this point stationary at the new location, and turning the modulated write beam back on. Alternatively, if the point at which the write beam is focused is radially moved with respect to the disk as the modulated write beam makes marks thereon, a spiralling data track is created on the surface of the disk.

Whether the data tracks are concentric or spiralling, the available surface area on the disk is most efficiently used when the data tracks are spaced together as close as possible. The radial distance between adjacent data tracks is called the "track pitch". Accurately maintaining the track pitch at a desired value, especially where the track pitch must be kept small so as to efficiently make use of the storage space available on the disk, has presented a significant obstacle in the development of high storage capacity optical disk storage systems.

Data tracks are typically read by directing a read beam of radiant energy to a desired data track on the disk. This read beam typically has different parameters associated therewith than does the write beam (such as intensity and/or wavelength), thereby ensuring that the read beam does not mark the disk in the same manner as the write beam is designed to mark the disk. The read beam is either reflected from the surface of the disk, or passes therethrough (if the substrate of the optical disk is sufficiently transparent to allow the beam to pass therethrough), and the intensity of the read beam is modulated in accordance with the data marks that have been previously written in the data track by the write beam. The data marks typically comprise a sequence of reflectivity-high/reflectivity-low (or transmissivity-high/transmissivity-low) marks that modulate the reflected or transmitted read beam in accordance with the pattern of the stored data. Once modulated, the read beam is directed to a suitable optical detector where a modulated data signal is generated. The data is extracted from this signal during conventional demodulation techniques.

Whether the optical drive is reading or writing data, it is critically important to be able to set and maintain a prescribed track pitch. When writing data, the newly written data track must be spaced the prescribed track pitch distance from a previously written data track or other suitable reference. When reading data, the prescribed track pitch distance must be known so that the optical drive can direct the read beam to a desired track location on the surface of the disk as measured from a known location on the disk, such as an adjacent track. Moreover, if interchangeability of record carriers from optical drive to optical drive is to be preserved—a condition that must exist if the record carrier or disk is removable from the optical drive—the prescribed track pitch must be maintained from one record carrier to another, and from one optical drive to another. This is not an easy task to achieve given the numerous variations that naturally occur in the electrical and optical components used within any optical storage system.

To illustrate some of the difficulties encountered, when writing data tracks on a record carrier, the desired track pitch is typically achieved by positioning the write beam a prescribed distance from a reference beam that is following a previously written track. Hence, the goal is that the newly written track will be held at a constant distance from the next preceding already recorded data track. See U.S. Pat. No. 3,657,707 col. 11, lines 40-43. In order to maintain the prescribed distance between the two beams, however, some sort of control system must be used to keep the two beams separated the desired amount. While this goal is easily stated, the realization thereof is not easily achieved.

A significant first hurdle is to initially set the two beams so as to have the desired spacing therebetween. This is not a trivial task because of the nature of the elements involved. While galvonometer controlled mirrors and related optical components can be used to position one beam relative to another in response to a control signal, the initial value of the control signal must still be determined. Unfortunately, because of differences in the electrical and optical components from one optical drive to another optical drive, this control signal will not necessarily be the same for all optical drives.

Even assuming that the two beams can be initially spaced apart the prescribed distance, a difficulty arises in maintaining this distance. Both the electrical signals generated to set the distance, and the electromechanical elements used to respond to these signals, will not be perfectly stable over time and a range of environmental and other conditions. Moreover, the optical elements used within the drive to direct the beams to and from the surface of the record carrier will likewise exhibit some variations over time and environmental conditions, and especially will exhibit variations from optical drive to optical drive.

One approach for initially setting and maintaining a desired track pitch, as described in copending patent application Track Pitch Calibration System for use in Optical Storage Devices, Ser. No. 628,687, filed concurrently herewith, assigned to the same assignee as is this application, is to place a pair of calibration tracks having the desired track pitch therebetween on the disk or record carrier during the manufacture thereof. The track pitch of these calibration tracks is then optically measured when the record carrier is first inserted into the optical storage system (and at calibration intervals thereafter), in order to define an offset signal that defines the prescribed track pitch for that particular storage system, including the particular combination of electrical and optical elements found therein. This offset signal is thereafter used to set the desired spacing between the various beams used within the optical storage system to insure that the desired track pitch is maintained. Unfortunately, because the measurement of the track pitch of the calibration tracks is made optically, it is influenced by the presence or absence of data tracks adjacent to the tracks being measured. Hence, the calibration offset signal generated while measuring the pitch of the two calibration tracks will not be the same read offset signal needed to space two read beams apart the prescribed track pitch distance where there exists data tracks on both sides of the two tracks being read; nor will the calibration offset signal be precisely the same write offset signal needed to space a write beam from a read beam the prescribed track pitch distance when a data track is adjacent one side of the track being read, but no data track is adjacent to the other side of the track being written.

Hence, there is a need in the art for a track pitch calibration system that can initially set and maintain a desired track pitch in an optical storage system regardless of whether optical storage system is reading or writing data, and regardless of the number of data tracks found on the record carrier used with such a system (i.e., regardless of whether the record carrier is full, empty, or somewhere inbetween). The present invention addresses that need.

SUMMARY OF THE INVENTION

It is an object of the present invention to provide a track pitch calibration system for use with an optical storage system that provides a way to accurately set and maintain a prescribed track pitch as new data tracks are written on a removable record carrier used with such optical storage system.

It is another object of the present invention to provide such a track pitch calibration system that provides a track pitch offset signal that can be used by the optical storage system to both read and write data tracks at a prescribed track pitch.

It is a further object of the present invention to provide such a track pitch calibration system that sets and maintains the prescribed track pitch regardless of the particular optical drive within which the record carrier is inserted, thereby ensuring that any record carrier may be used with any optical drive of the optical storage system.

Another object of the present invention is to provide such a track pitch calibration system that is essentially immune from variations that may occur in the electrical, electromechanical, and optical components used within the optical drive, which variations occur over time and a range of environmental and other external conditions.

Still another object of the invention is to provide a track pitch calibration system that is realized using a minimum number of extra components within the optical drive, and that occupies minimal storage space on the record carrier to be inserted into the drive.

A further object of the present invention is to provide a track pitch calibration system for use with an optical storage system that accurately sets and maintains an offset control signal for use in defining a prescribed track pitch regardless of whether data is being read or written from or to a removable record carrier used with such optical storage system.

The above and other objects of the present invention are realized by a track pitch calibration system that utilizes the optical read and write components of an optical drive in conjunction with a set of calibration data tracks that are previously written on a record carrier, which record carrier is designed to be removably inserted into the optical drive. The calibration tracks are precisely spaced apart, using precision optical equipment available only at the manufacturing site of the record carrier, so as to exhibit the prescribed track pitch. Advantageously, the calibration tracks used to provide the optical track pitch measurement have additional calibration tracks placed adjacent thereto to provide the same background pattern that the optical system encounters when reading or writing data. When the record carrier is first inserted into the optical drive, a calibration mode is initiated during which this caibration track pitch is optically measured. An offset signal representative of this optical measurement is generated and stored. This offset signal is subsequently used within the optical drive to help control the desired reading and writing operations.

During a read operation, the offset signal is used to position a first read beam with respect to an (N−1)th data track (a previously written data track that is adjacent to an Nth data track, the Nth data track being the desired data track to be read) so that a second read beam, positioned a fixed distance from the first read beam for that particular optical drive, will track and follow the Nth data track. During a write operation, the offset signal is likewise used to position a first read beam with respect to an N−1)th previously written data track so that a write beam, positioned a controlled distance from the first read beam, will write an Nth data track at the prescribed track pitch from the previously written (N−1)th data track. The drive may initiate the calibration mode as often as necessary to update the value of the offset signal.

Advantageously, the optical track pitch measurement of the calibration data tracks is realized using the set of read beams already available within the optical drive to follow the (N−1)th and Nth data tracks. The read beams associated with this set of read beams have a substantially fixed relationship therebetween for a given optical drive. However, this relationship will vary from optical drive to optical drive, and may vary slightly over time and changes in environmental conditions for a given optical drive. Hence, by regularly measuring the track pitch of the calibration data tracks with this set of read beams, any such variations in position of the beams will be factored out and an accurate track pitch offset signal for that particular drive at that particular time can be generated.

BRIEF DESCRIPTION OF THE DRAWINGS

The above and other objects, features, an advantages of the present invention will be more apparent from the following more particular description thereof, presented in conjunction with the following drawings wherein.

DETAILED DESCRIPTION OF THE INVENTION

The following description is of the best presently contemplated mode of carrying out the invention. This description is not to be taken in a limiting sense, but is made merely for the purpose of describing the general principles of the invention. The scope of the invention should be determined with reference to the appended claims.

The invention is best understood by referring to the drawings, wherein like numerals are used to refer to like parts throughout. Further, the invention will be better understood if some basic information is first given with respect to beam alignment systems and optical storage systems.

Figure 1:
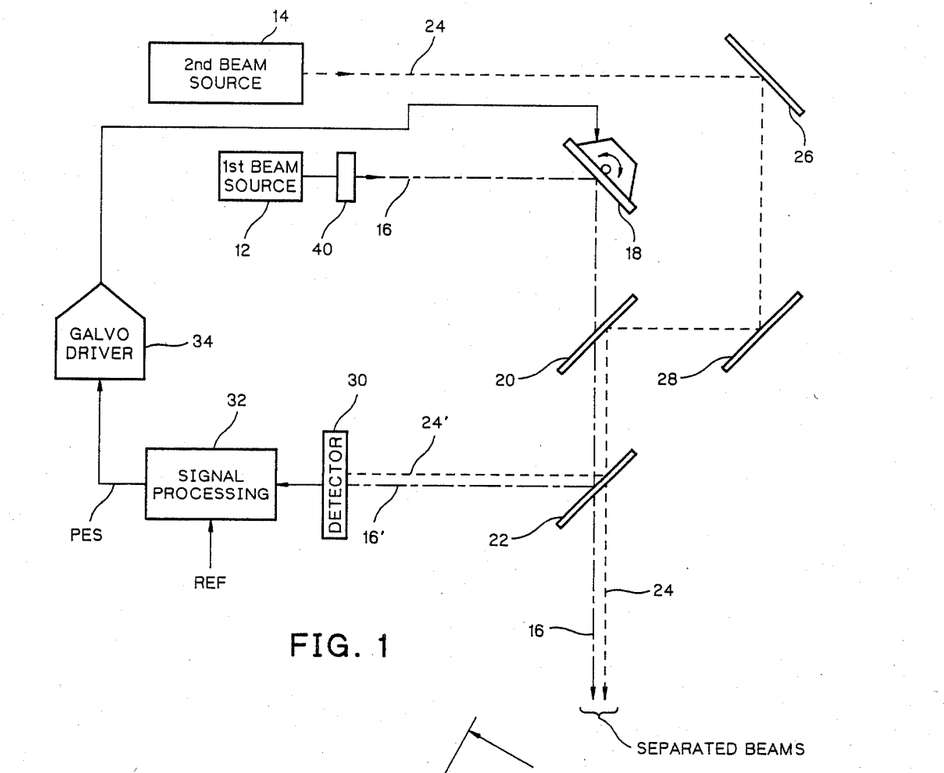
FIG. 1 is a simplified block diagram of a beam alignment system used to position one beam a desired distance from another beam.

Referring first to FIG. 1, there is shown a simplified block diagram of a beam alignment system used to position two beams in a desired relationship. As described more fully below, such a beam alignment system may be used with the track calibration system of the present invention in order to position a write beam a prescribed distance from a read beam so as to realize a desired track pitch. A first beam source 12 and a second beam source 14 respectively generate radiation beams that follow the paths indicated. The beam from the first beam source 12 is represented by the dashed single-dot line 16. As indicated in the figure, the beam 16 is reflected off of a galvonometer controlled mirror 18, passes through a beam combiner 20, and a beam splitter 22, and continues along an optical path in the direction indicated. (It is to be understood that in connection with FIG. 1, when reference is made to a beam, such as the beam 16, that the path which the beam is following may also be referred to as the optical path 16 along which the beam 16 is traveling).

The second beam source 14 also generates a beam 24, represented as a dashed line in FIG. 1, which follows a path that reflects off of a mirror surface 26, a mirror surface 28, and a surface of the beam combiner 20. At the beam combiner 20, the path of the beam 24 is substantially parallel to the path of the beam 16, although variations in the angle of the galvonometer controlled mirror 18 may cause the beam 16 to be somewhat out of parallel with the beam 24. However, as those skilled in the art will recognize, the angular displacement of the galvonometer controlled mirror 18 is very slight, and the two beams 16 and 24 are considered to be following the same optical path even though one may not be truly parallel to the other. Moreover, conventional means may be used, such as prisms, to bend a beam of light by an appropriate amount to make it parallel to another beam.

As the beam 16 passes through the beam splitter 22, a portion of the beam 16, represented as 16′, is split off and directed to a detector 30. Likewise, a portion 24′ of the beam 24 is split off from the beam 24 as the beam 24 passes through the beam splitter 22. The split off portion 24′ is also directed to the detector 30. Advantageously, the alignment between the split off beams 16′ and 24′ is proportional to the alignment of the beams 16 and 24 as these beams pass through the beam splitter 22. This means that the alignment between the beams 16′ and 24′ at the point where these beams strike the surface of the detector 30 is either the same as, or proportional to, the alignment between the beams 16 and 24 at the point where the beams 16 and 24 pass through the beam splitter 22. Because radiation beams, absent external forces, travel in a straight line, this means that the alignment between the beams 16′ and 24′ at the surface of the detector 30 will be proportional to the alignment between the beams 16 and 24 anywhere along the common path shared by the beams 16 and 24.

The detector 30 measures the alignment between the two beams 16′ and 24′. This alignment measurement is processed by signal processing circuitry 32 where an error signal is generated. The error signal represents the difference between h measured beam alignment and a desired alignment. As such, the error signal is referred to as a position error signal (PES). After being appropriately amplified and buffered in a galvodriver 34, the PES is used to steer the galvonometer controlled mirror 18. Conventional servo control techniques are used to drive the PES signal to zero, thereby forcing the beam 16 to assume a desired alignment with respect to the beam 24. Further details associated with the beam alignment system shown in FIG. 1 may be found in pending U.S. Patent Application Beam Alignment System, filed concurrently herewith, Ser. No. 628,684, assigned to the same assignee as is this application, which application is incorporated herein by reference in its entirety.

Figure 2:
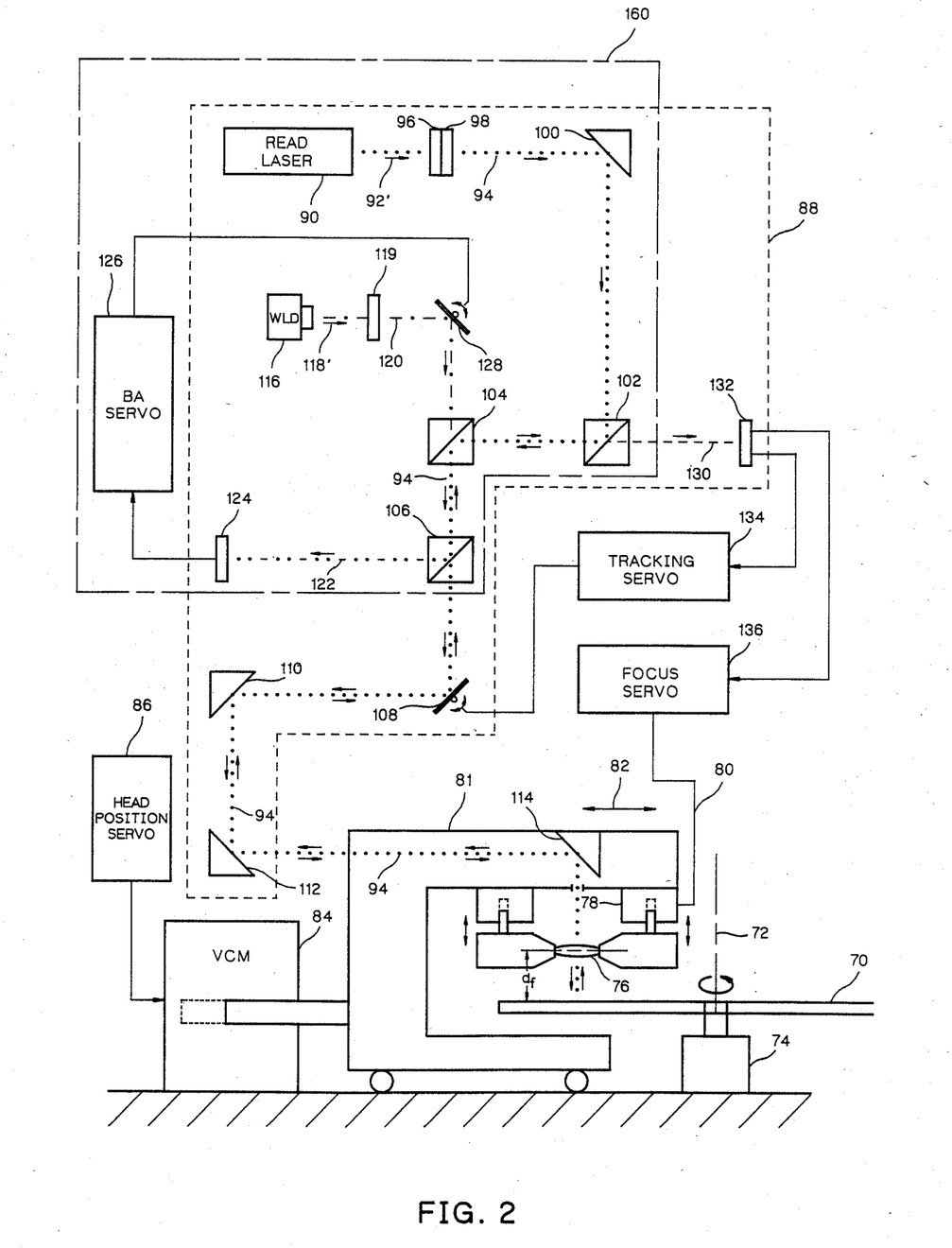
FIG. 2 is a block diagram of an optical storage system, and shows the principal optical elements found in the optical drive.

Referring next to FIG. 2, a block diagram of an optical disk storage system is shown. The beam alignment system of FIG. 1 is included in FIG. 4 as those elements enclosed within the dashed line 160, and this alignment system is used in such a storage system to provide a desired alignment between a read beam and a write beam. The optical disk storage system includes a record carrier 70 and an optical drive (all of the elements in FIG. 2 except that carrier 70). The record carrier includes radiation sensitive layers placed thereon that can be marked by a beam of radiant energy. In the configuration shown in FIG. 4, the record carrier 70 is an optical disk that is rotated about a rotational axis 72 by a motor 74. (Other means could be used, of course, to create relative motion between the record carrier and a beam of radiant energy.) An objective lens 76 is disposed adjacent to the surface of the disk 70. The distance $d_f$ from the lens 76 to the surface of the disk 70 is controllable by focusing means 78, which focusing means responds to a focus control signal appearing on signal line 80. The focus means 78 may be realized with any suitable means for achieving the desired motion, such as a voice coil motor (VCM), or the like.

The lens 76 and focusing means 78 are mounted to an optical head 81 that is slidably mounted for radial movement in the direction of the arrow 82 with respect to the record carrier or disk 70. This movement is typically realized by means of a VCM 84 that positions the optical head 81 in response to a suitable control signal generated by a head position servo system 86. The details of the head position servo 86 are not important to the present invention, but a suitable positioning servo is described in co-pending application Ser. No. 438,133, filed Nov. 1, 1982, assigned to the same assignee as is the present application.

The optical components used to generate the beams that are directed to the surface of the disk 70 are mounted on a stationary optical plate 88. These components include a read laser source 90 that generates a read beam 92'. The beam 92' follows an optical path 94 indicated in FIG. 2 as a dotted line. As will be explained more fully below, the read beam 92' is diffracted into a plurality of beams by optical gratings 96 and 98. All of these beams are parallel having a fixed spacing therebetween as determined by the gratings 96 and 98, and they all follow the dotted line path 94. This path 94 directs the beams off of a mirrored surface 100, to a beam separator 102, to a beam combiner 104, through a beam splitter 106, off of a galvonometer controlled mirror 108, off of fixed mirrored surfaces 110 and 112, and into the optical head 81 where the path further includes at least one additional mirrored surface 14 which directs the beams following the path through the objective lens 76 onto a desired point of the surface of the rotating disk 70.

A write laser diode 116 generates a write laser beam 118' that follows an optical path 120 indicated by the dashed single-dot line in FIG. 2. This write path 120 joins the primary beam path 94 (dotted line) at the beam combiner 104. Hence, from the point of the beam combiner 104 to the surface of the disk 70, the path 94 is shared by both the read beams and the write beams. (The small arrows on either side of the optical path 94 indicate the direction that the various beams are traveling at that point along the path 94.)

The beam splitter 106 splits off a portion of the beams traveling through the path 94 and directs them along an optical path 122, represented in FIG. 2 by a dashed double-dot line. This path terminates at a beam alignment detector 124. The detector 124 is positioned so that only beams split off from the write beam 118 and a desired read beam are mapped onto the surface of the detector 124. The position of the spots appearing on the detector 124 are measured and processed in a beam alignment servo 126. The beam alignment servo 126 provides a control signal to a galvonometer controlled mirror 128 which steers the write beam 118 as it is fed into the optical path 94 at the beam combiner 104.

The read beams that strike a surface of the disk 70 are reflected back along the optical path 94 all the way back to the beam separator 102. At this point, the reflected beams are directed along a path 130, represented in FIG. 4 as a dashed line. This path 130 directs these beams to a second optical detector 132. This detector 132 serves two functions: (1) it detects the position of a first group of read beams that fall upon a surface thereof and this information is fed to a tracking servo 134, which tracking servo provides the control signal for steering the galvonometer controlled mirror 108; and (2) it detects whether or not the beams that are falling upon the surface of the disk 70 are in focus, and feeds this information to focus servo circuitry 136, which focus servo 136 generates an appropriate control signal directed to the focusing means 78 over signal line 80 in order to place and maintain the lens 76 at a desired in-focus position. As can be seen from FIG. 2, the galvo mirror 108 jointly steers all of the beams that are traveling along the optical path 94 to and from the surface of the disk 70. Hence, the tracking servo 134 jointly steers all of the beams so that they strike the surface of the disk 70 at a desired location. The focus servo 136 ensures that all these beams are properly focused when they strike the surface of the disk 70.

Figure 3:
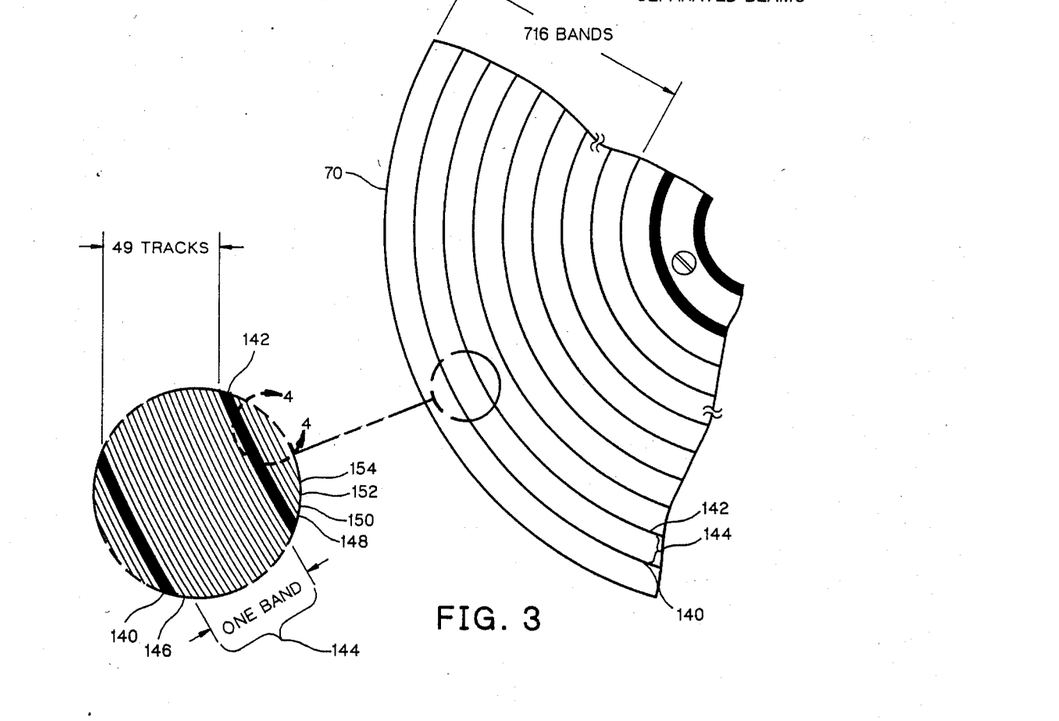
FIG. 3 is a partial top plan view of an optical disk or record carrier of the type used within the optical storage system of FIG. 2, and includes an expanded view of a portion of the surface of the disk to illustate how the data tracks are arranged thereon.
Figure 4:
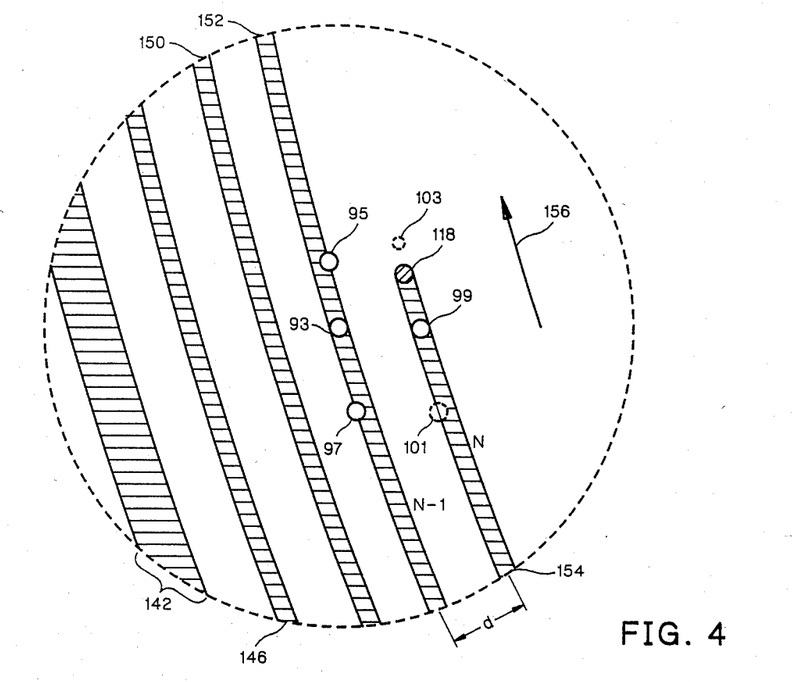
FIG. 4 is an enlarged view of the disk surface area bounded by the circular dashed line 4—4 in FIG. 3, and shows the beam spot pattern created by a plurality of radiation beams at this spot pattern is controllably positioned to follow the (N−1) th track as the Nth track is written.

In order to better understand the track pitch calibration system of the present invention and how it relates to the operation of the optical disk storage system illustrated in FIG. 2, reference is now made to FIGS. 3 and 4 in order to illustrate a preferred format of the optical disk 70. In FIG. 3, a portion of the disk surface 70 is illustrated. This disk is divided into a large number of concentric data bands comprising a plurality of data tracks into which data may be stored. Concentric coarse servo tracks separate one data band from another. Two such coarse servo tracks 140 and 142 are illustrated in the enlarged portion of FIG. 3. A first data track 146, adjacent to the coarse servo track 140, is previously written on the disk during the manufacture thereof and is used to identify the data band 144. This first data track in the data band is referred to as the "home address track". As illustrated in the figure, the data band 144 contain a larger number of data tracks. In the preferred embodiment, 49 tracks, including the home address track 146, are included in a data band. Further, there are 716 such bands included on a given disk 70.

Referring to FIG. 4, an expanded view of a portion of the disk surface 60 encircled by the dashed line 4—4 in FIG. 3 is shown. This expanded view includes a portion of a coarse servo track 142, a home address track 148, two data tracks 150 and 152, and a partially written data track 154. In FIG. 4, it is assumed that the disk is rotating in the direction indicated by the arrow 156.

Included in FIG. 4 are a pattern of seven spots, representing the location at which the various beams strike the surface of the disk after following along the optical path 94 (FIG. 2). A write spot 118 is directed to a desired point on the disk so as to create the write track 154 as the disk rotates in the direction indicated by the arrow 156. The read beam 92' is split into 6 beams by the defraction gratings 96 and 98 (FIG. 2), and these beams form a spot pattern as illustrated in FIG. 4. (Note: A spot results from a beam that is directed to the surface of the disk. Hence, in the description that follows, the terms "beam" and "spot" are closely interdependent). A first read spot 93 is centered on the previously written data track 152. Track following spots 95 and 96 are positioned in front and behind the read beam 93 and offset so as to provide a dual beam tracking function as is known in the art. Basically, in accordance with the teachings of the art, the detector 132 (FIG. 2) is able to detect when the spots 95 and 97 are half on and half off of the track 152 which they are following. If they are not exactly half on and half off of the track, an error signal is generated by the track servo 134 to steer the spots in an appropriate direction to make them follow the track 152. The read spot 93 is positioned midway between the tracking spots 95 and 97, thereby causing the read spot 93 to follow the data track 152. (The previously written data track 152 that is being followed by these tracking spots 95 and 97 will hereafter be referred to as the (N−1)th track.) An additional read spot 99 is positioned relative to the spots 93, 95, and 97, so as to fall behind the write spot 118 a short distance. This read spot 99 is used to read the data written in the track 154 immediately after it has been written therein by the write beam so that if an error is detected the incorrect data may be flagged or marked and the data may be correctly written over again.

Two additional read spots 101, 103 are positioned relative to the read spot 99 in a configuration that is similar to the positioning of the tracking spots 95 and 97 with respect to the read spot 93. These "auxiliary" read tracking spots 101, 103 serve no purpose when a track is being written by a write spot as shown in FIG. 4. Hence, the spots are shown only as dashed circles. However, these spots serve a very important purpose during a track pitch calibration mode of the optical disk storage system, as explained below.

Figure 5:
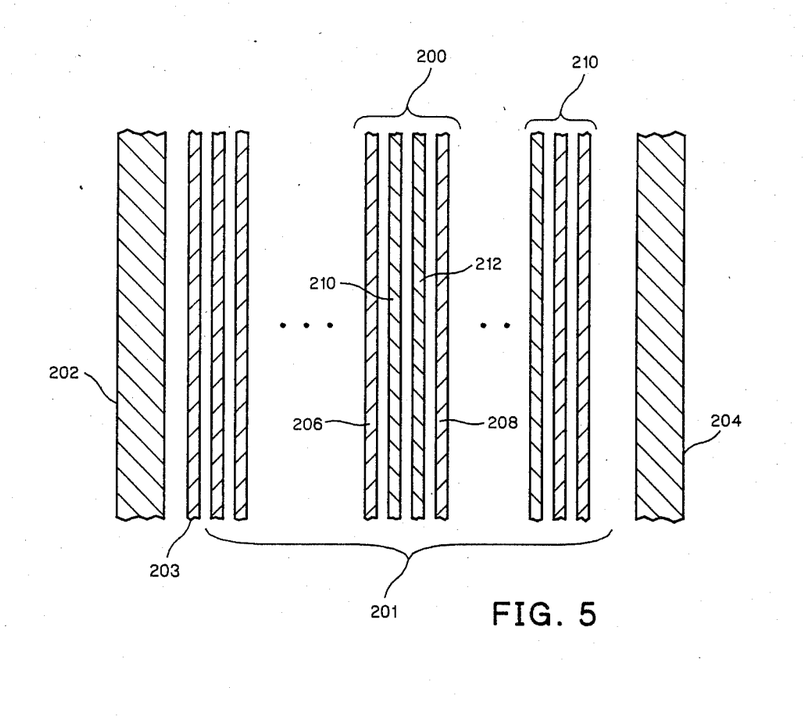
FIG. 5 is a top view of a portion of a selected band of the disk of FIG. 3, and shows the calibration data tracks that form a part of the present invention.

The optical disk 70 used in the optical storage system shown in FIG. 2 is preferably a removable disk that may be used in any compatible optical disk drive. Because the various optical drives cannot be identically alike, there will be variations from drive to drive with respect to the alignment of the read spots created by passing the read beam 92′ through the optical gratings 96 and 98. Moreover, some of the components used within the stationary optics plate 88 will drift somewhat over time and with variations in temperature and other environmental factors. Therefore, a constant fixed stable pattern between the spots 93, 95, 97, 99, 101, and 103 cannot be guaranteed from drive to drive and over a period of time. To account for these slight variations that will occur, and in order to guarantee a fixed track pitch distance, d (see FIG. 4), the track pitch calibration system of the present invention is employed. According to the present invention, one band 201 on the disk 70 has previously written thereon, during the manufacture of the disk, a plurality of calibration data tracks 200 that are precisely spaced at the desired track pitch. A partial view of this special calibration band 201 is illustrated in FIG. 5. As with other bands on the disk, this band is bounded by coarse servo tracks 202 and 204, and a home address track 203 is also included. In the preferred embodiment of the present invention, the calibration band 201 is the outer-most band on the disk, although the band could be placed anywhere on the disk and still serve the same function. The calibration data tracks 200 lie approximately in the center of the calibration band 201. In accordance with a preferred embodiment of the present invention, at least 4 calibration data tracks are provided. The outer two calibration tracks 206 and 208 are written with the data pattern 33H (hexadecimal), repeating. The inner two data tracks 210 and 212 are written with the data pattern 92H, 49H, 24H (hexadecimal), repeating. These data patterns are not critical, and any repeating data pattern could be employed, so long as the same patterns are used on all disks for the same tracks.

In accordance with one embodiment of the invention, a second group of calibration tracks 210 may be placed towards one end of the calibration band 201, or within another band on the disk 20. This second group of calibration tracks 210 is characterized by having only three data tracks therein, and by having no data tracks adjacent one side thereof. The group of calibration tracks 210 could be included within the group of calibration tracks 200 providing no data track is written adjacent track 208 (or 206).

The calibration data tracks are written on the disk surface during the manufacture thereof so as to have a precise track pitch spacing therebetween. In the preferred embodiment, the data tracks have a track width of 0.8±0.1 micrometers (microns), and a track pitch of 1.65±0.09 microns. The calibration data tracks are written using precision optical servo writing equipment adapted for use in a disk manufacturing facility. Such equipment is expensive, bulky, and difficult to use without proper training and a controlled environment. In short, the precision nature of this equipment makes it ill-suited for any use other than a manufacturing or laboratory use. Hence, the techniques used in such equipment to achieve a precise track pitch, which techniques are known in the art, are not available for use in a less complex and less expensive optical drive of the type contemplated for use with the present invention.

Figure 6A:
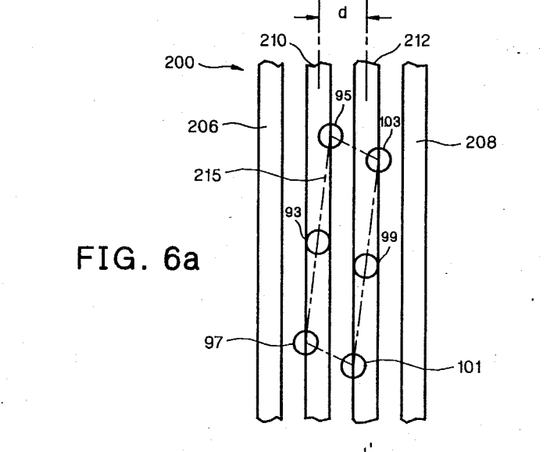
FIGS. 6a and 6b show aligned and misaligned conditions respectively between the read beam spot pattern of FIG. 4 and the calibration data tracks of FIG. 5.
Figure 6B:
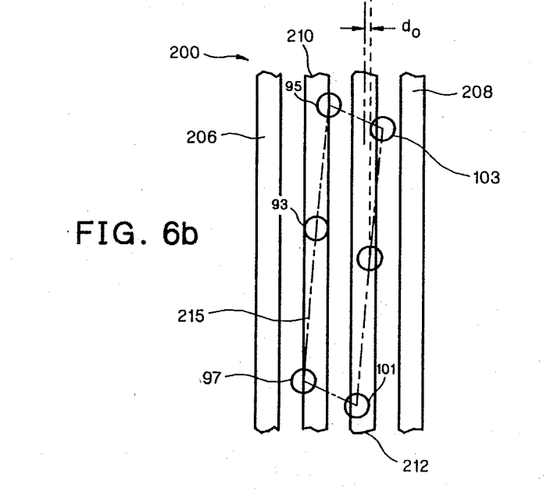

Referring next to FIGS. 6a and 6b, the read beam spot configuration is shown superimposed on the calibration data tracks 200. When the disk is first inserted into an optical drive, such as shown in FIG. 2, the optical head 80 is positioned such that the six read spots 93, 95, 97, 99, 101, and 103 (which spot configuration is hereafter referred to as the spot configuration 215) are positioned over the calibration tracks 210 and 212. These six read spots will essentially have a fixed relationship (i.e., a fixed spot configuration 215) for any given optical drive. However, this spot configuration 215 will vary somewhat from drive to drive, and may vary within a given drive over time and with changes in environmental conditions. Hence, when the spots of the configuration 215 are superimposed over the calibration tracks, they may or may not align therewith.

FIG. 6a depicts an aligned condition. That is, in FIG. 6a the dual tracking spots 95 and 97 are half-on and half-off of the track 210; and the dual tracking spots 101 and 103 are half-on and half-off of the track 212. FIG. 6a thus illustrates a "zero-offset" condition wherein the tracking spot configuration created by the read beams is perfectly aligned with the desired track pitch. In such a zero offset condition, no adjustments need to be made to the subsequent positioning of the spot configuration relative to a previously written track in order to achieve a desired track pitch between the center spots 93 and 99. Hence, if writing, the write beam 118′ (FIG. 4), and consequently the write spot 118, can be controllably positioned relative to either read spot 93 or 99, using a beam alignment system as described previously in connection with FIG. 1, in order to ensure that the desired track pitch is achieved. If reading, either spot 93 or 99 will be aligned with either the (N−1)th or Nth data track, respectively, so that either read spot can be used to read the data in it's respective data track.

In FIG. 6b, the spot configuration 215 does not align with the calibration tracks 200. (FIG. 6b only illustrates one of many possible misalignment situations that could exist. However, all are handled in the same fashion.) In such a situation, the entire spot configuration 215 is moved until the first group of tracking spots 95 and 97 are aligned (half-on and half-off) with the calibration data track 210. Then the "misalignment" or "track pitch offset" between the second group of tracking spots 101 and 103 and the calibration data track 212 is measured. This offset is represented as the distance $d_o$ in FIG. 6b.

Figure 8:
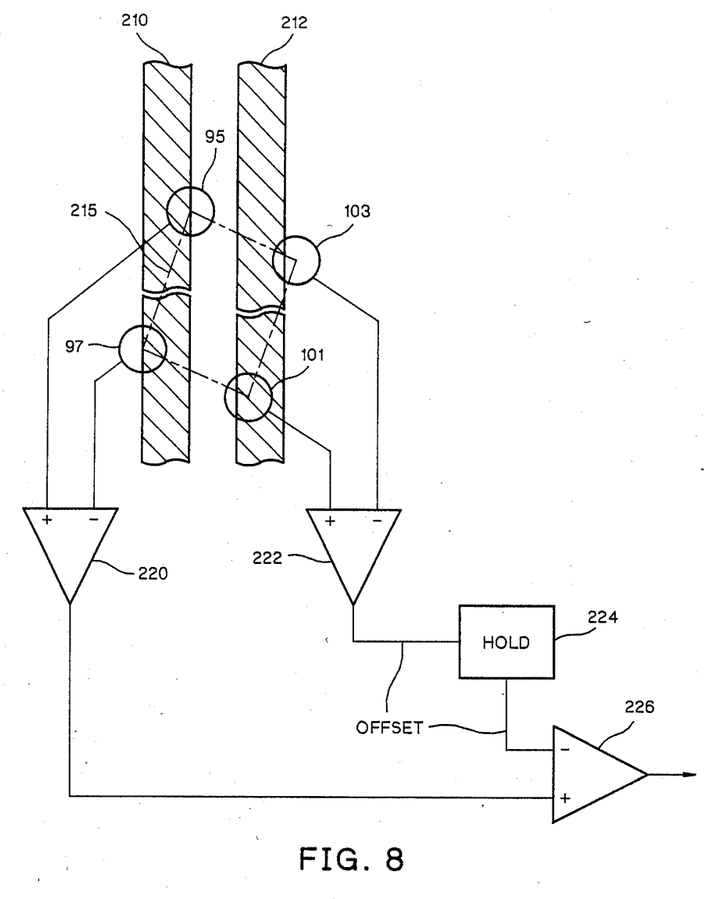
FIG. 8 is block diagram illustrating how the alignment between the read beam spot pattern and two data tracks, or two calibration tracks, is measured.

Referring next to FIG. 8, the measurement of the track pitch offset $d_o$ is conceptually illustrated. The first group of tracking spots 95, 97 are aligned with the data track 210. Such alignment generally occurs when the spots 95 and 97 are half-on and half-off of the track, thereby creating a zero offset tracking signal out of the tracking amplifier 220. This tracking amplifier 220 compares the reflected radiant engery from spot 95 with the reflected radiant energy from spot 97. If the spots are aligned with the track (half-on and half-off), then these reflected radiant energies will cancel out. (In practice, the spot 95 may be somewhat misaligned with the spot 97, thereby making it impossible for both spots to be half-on and half-off of the track. Nonetheless, there will always be a position where the spots can be equally-on and equally-off of the track, thereby creating the null signal in the tracking amplifier 220.)

With the tracking spots 95 and 97 aligned with the track 210, the misalignment or offset associated with the tracking spots 101 and 103 relative to the track 212 is measured in tracking amplifier 222. As emphasized in FIG. 8, spot 101 is more on the track than is spot 103. This means that the reflected energy from spot 101 will be different than the reflected energy from spot 103, thereby creating an "offset" signal in the amplifier 222 that is proportional to the misalignment between the spot configuration 215 and the desired track pitch. This "offset" is held in a storage element 224, from which it can subsequently be retrieved for future use. For subsequent read operations, for example, this stored value is compared to the offset generated by tracking amplifier 220 in tracking amplifier 226. The spot configuration 215 is adjusted until the spots 95 and 97 have been shifted an amount equal to this offset (see FIG. 7a), which conditional occurs when the output of amplifier 226 is nulled.

Figure 7A:
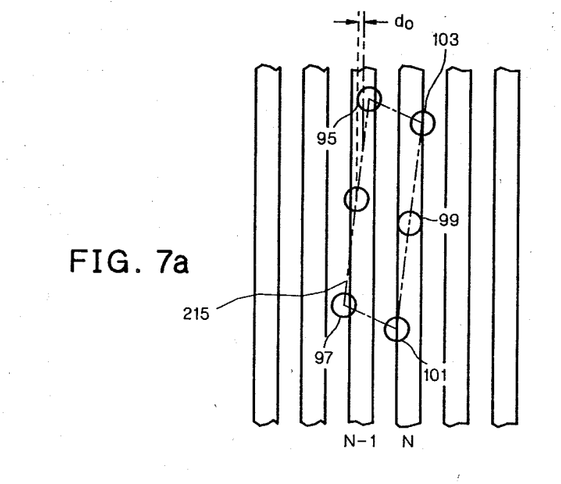
FIG. 7a illustrates how an offset measured for a condition such as that shown in FIG. 6b could be used in reading the Nth track as the (N−1)th track is followed.
Figure 7B:
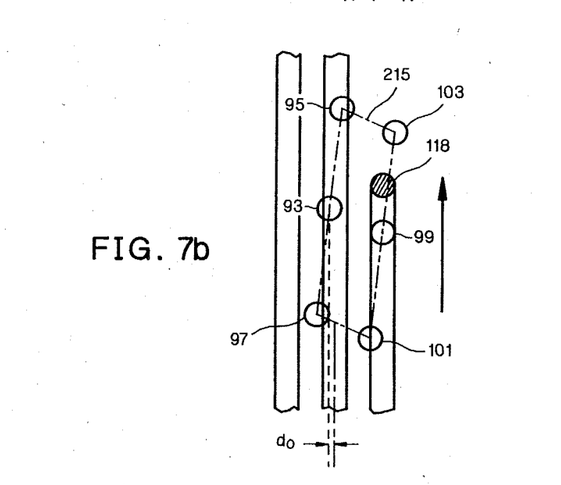
FIG. 7b illustrates one approach of how an offset measured for a condition such as that shown in FIG. 6b could be used in writing the Nth track as the (N−1)th track is followed.
Figure 9:
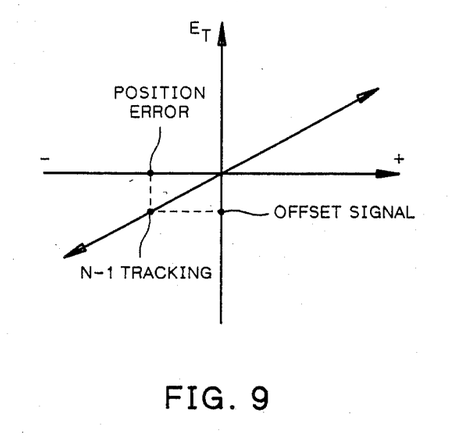
FIG. 9 illustrates how the offset signal generated by the measurement system of FIG. 8 varies as a function of position error between the spot pattern and the measured tracks.

FIGS. 7a and 7b illustrate how the track pitch offset signal may be used to read and write data in accordance with the prescribed track pitch. In FIG. 7a, tracking spots 95 and 97 are deliberately offset from the (N−1)th track by an amount commensurate with the measured offset $d_o$, thereby causing the tracking spots 101 and 103 to be aligned with the Nth track. Thus, the read spot 99 is aligned with the Nth track and can be used to read the data written therein. Similarly, in FIG. 7b, tracking spots 95 and 97 are deliberately offset from the (N−1)th track by an amount commensurate with the measured offset $d_o$ so that the write spot 118, when properly aligned with the read spot 99, can be used to write the Nth data track having the prescribed track pitch as measured relative to the (N−1)th data track. Both FIGS. 7a and 7b are examples of N−1 tracking schemes. FIG. 9 illustrates the relationship between the position error (the error or misalignment between the spot configuration 215 and the desired track pitch) and the offset signal for such an N−1 tracking scheme.

In accordance with the present invention, when the radiation energy is reflected off of the surface of the disk back to a detector, a Gaussian beam intensity distribution is associated with this reflected energy. Moreover, because the tracking spots or beams 95, 97, 101, and 103 are offset from the center of the tracks, the reflected intensity distribution is affected by the presence of an adjacent track or the absence of an adjacent track. For example, it can be shown that for spot 101 (FIG. 6a), the influence of the $N^{th}$ track (track 212) is $0.56 I_o$, where $I_o$ is the intensity of the reflected beam if it were centered on the data track 212. The influence of the (N−1)th track (track 210) on spot 101 is $0.04I_o$. Hence, spot 101 is influenced a total of $0.60I_o$. In order to balance this reflected energy with respect to spot 103, track 208 is placed immediately adjacent thereto. Without the presence of adjacent track 208, an imbalance condition would be created that could translate to a mis-calibrated offset during any subsequent read operation. Track 206 is added adjacent to track 208 for the same reason, i.e., to insure that the reflected energies from spots 95 and 97 are equal.

The presence of the track 208 adjacent to the calibration track 212, (FIG. 6a), while preventing mis-calibrated offsets for subsequent read operations, will cause mis-calibrated offsets for subsequent write operation (e.g., FIG. 7b). That is, during a subsequent write operation there is no (N−1)th track adjacent to the Nth track being written. To prevent mis-calibrated offsets from occuring, therefore, regardless of whether the subsequent operation is a read or write function, two groups of calibration tracks are provided, as discussed above. A first group (e.g., calibration tracks 210, 212 in FIG. 5) has outside tracks on either side thereof and is used to define the offset for subsequent read operations. A second group (e.g., calibration tracks 208, 212 in FIG. 5, assuming no track is placed to the right of track 208) has no outside track on one side thereof, but does have an outside track on the other side. This latter group is used to define the offset for subsequent write operations.

Figure 11:
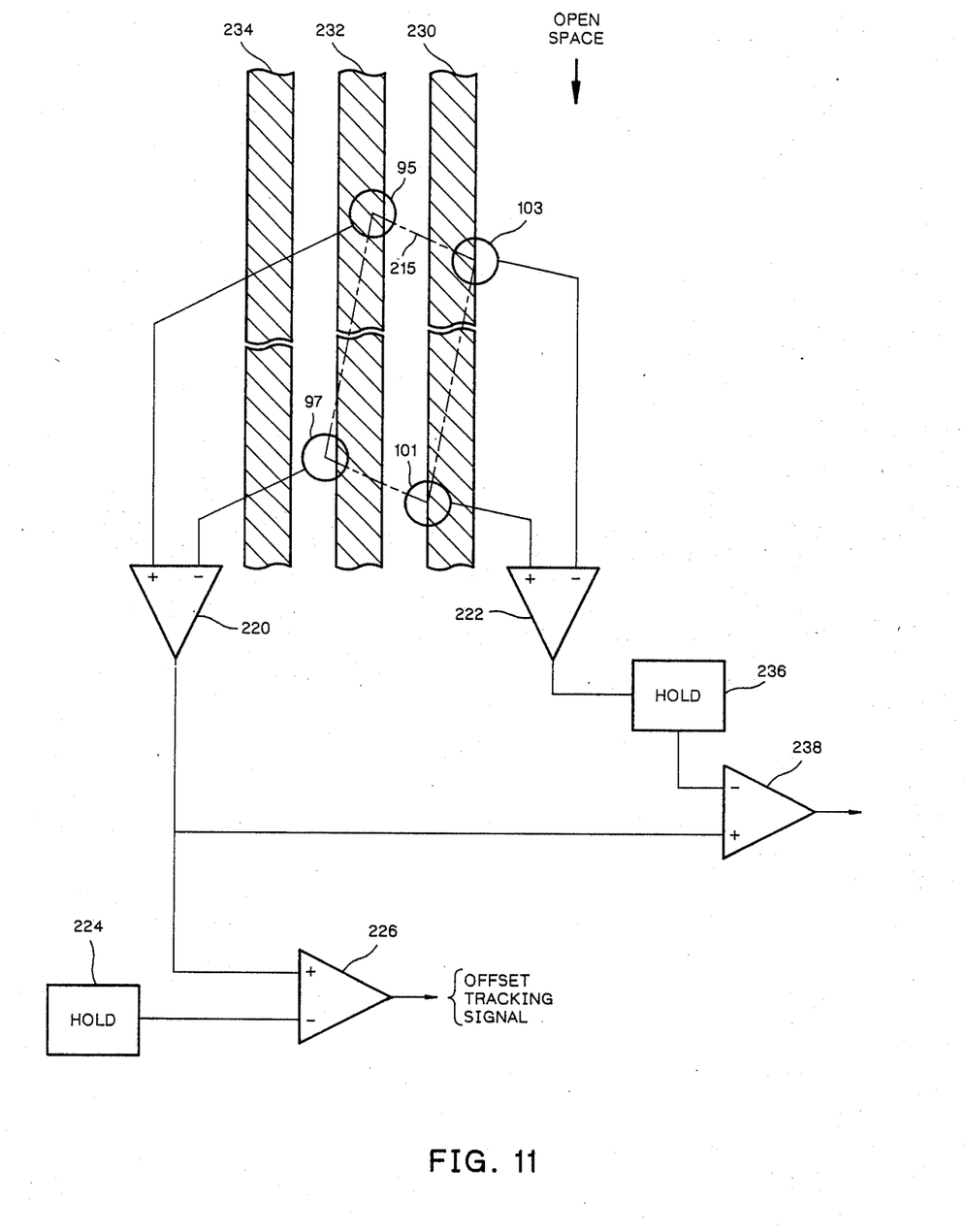
FIG. 11 illustrates how a second pair of calibration tracks, having a blank space on one side thereof, is used to properly calibrate the offset for subsequent write operations.

In operation, the offset for subsequent write operations, assuming a second group of calibration tracks exists that has no outside data track on one side thereof, is defined as follows, and as illustrated in FIG. 11. The spot configuration 215 is positioned such that spots 101 and 103 are centered over and track the last calibration track 230 (the track having no track adjacent the right side thereof). Spots 95 and 97 are thereby placed over the next to last calibration track 237, which track has another calibration track 234 adjacent the other side thereof and these spots are allowed to track this next to last calibration track 232 using the offset tracking signal (from amplifier 226) normally used for a subsequent read operation (e.g., FIG. 7a and FIG. 8). With spots 95 and 97 tracking the next to last calibration track in this fashion, the tracking error signal coming from the spots 101 and 103 is stored in storage element 236. This stored tracking error signal is then added (with opposite polarity) in amplifier 238 to the tracking error signal coming from spots 95 and 97 to compensate for the "open space" during the subsequent writing of a new data track.

In practice, the circuit functions illustrated in FIGS. 8 and 11 can be realized using commercially available circuit components known to those skilled in the electronic arts. Moreover, it is contemplated that once the tracking signals have been generated by amplifiers 220, 222, that suitable conversion techniques could be used to convert the analog signals to digital signals, and to convert the digital signals back to analog signals as required, thereby allowing the "hold" function of elements 224 and 236 to be carried out digitally using the memory features of digital processing circuitry, such as a microprocessor.

Figure 10:
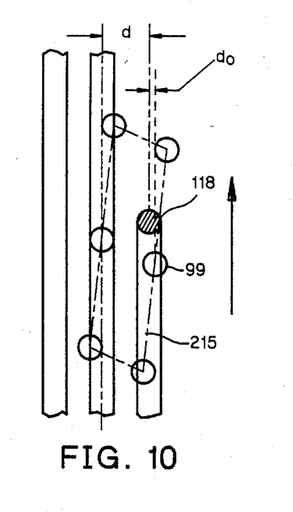
FIG. 10 depicts an alternative approach of how the offset measured for a condition such as that shown in FIG. 6b could be used in writing the Nth track as the (N−1)th track is followed.

FIG. 10 illustrates an alternative N−1 tracking scheme where the tracking spots 95 and 97 are aligned with the (N−1)th track, and the write beam 118 is positioned the desired track distance d from the (N−1)th read spot 93 using a suitable beam alignment servo. This scheme also produces a new Nth data track having the prescribed track pitch, but offers the disadvantage of having the read beam 99 slightly off center of the newly written Nth track. For small offsets, this misalignment of the read beam 99 would not be a serious problem. However, if the misalignment becomes excessive, it would be difficult to accurately read the data with the read beam 99 immediately after it has been written with the write beam 118.

While the invention herein disclosed has been described by means of specific embodiment sand applications thereof, numerous modifications and variations could be made thereto by those skilled in the art without departing from the spirit and scope of the present invention. Accordingly, it is to be understood that within the scope of the appended claims, the invention may be practiced otherwise than as specifically described herein.

What is claimed is:

1. An optical track pitch measurement system comprising:
    a first pair of calibration tracks placed on a record carrier during the manufacture thereof, having at least one data track adjacent both sides thereof, said first pair of calibration tracks and adjacent data tracks having a prescribed spacing or track pitch therebetween;
    a second pair of calibration tracks placed on said record carrier during the manufacture thereof, having a data track adjacent one side thereof but not the other side, said second pair of calibration tracks and adjacent data track having said prescribed track pitch therebetween;
    first means for optically measuring the track pitch between said first pair of calibration tracks, and for generating a first offset signal representative of said first track pitch measurement; and
    second means for optically measuring the track pitch between said second pair of calibration tracks and for generating a second offset signal representative of said second track pitch measurement;
    whereby said first offset signal provides an accurate measure of the desired track pitch having additional data tracks on either side thereof; and said second offset signal provides an accurate measure of the desired track pitch when optically reading or writing data tracks having a data track on only one side thereof.

2. The optical track pitch measurement system of claim 1 wherein said first and second means for optically measuring the track pitch between said first and second pair of calibration tracks respectively comprises:
    a group of radiation beams selectively directed to the surface of the record carrier at the location where either said first or second pairs of calibration tracks are located, said beams having a prescribed physical relationship therebetween, said beams casting a fixed spot configuration on the surface of the disk at the location where said beams strike the surface of the record carrier;
    third means for optically measuring the relative alignment of said first or second pairs of calibration tracks with respect to said fixed spot configuration; and
    means for converting the alignment measurement of said third means to a measurement of the track pitch between said first or second pairs of calibration tracks.

3. The optical track pitch measurement means of claim 2 wherein said fixed spot configuration comprises a first group of spots that are spaced-apart a prescribed distance from a second group of spots; and wherein said third optical measurement means includes
    means for aligning the first group of spots with one of the calibration tracks of the pair of calibration tracks being measured, and
    means for measuring the misalignment, if any, between the second group of spots and the other of the calibration tracks of said pair of calibration tracks being measured.

4. The optical track pitch measurement system of claim 1 wherein said first and second pairs of calibration tracks and adjacent data tracks comprise a group of specially written data tracks that are spaced apart on the record carrier so as to have the prescribed track pitch therebetween.

5. The optical track pitch measurement system of claim 4 wherein said first and second pairs of calibration tracks share a common calibration track.

6. A track pitch calibration system for use in an optical storage system to insure that radiation beams directed to a surface of a record carrier used with said storage system are properly aligned with data tracks written on said record carrier, said storage system including means for following a previously written track with a first radiation beam, and means for positioning a second radiation beam a desired distance from said first radiation beam in response to an offset signal, said track pitch calibration system comprising:
    a set of at least four calibration tracks written on the record carrier having a desired track pitch or distance therebetween; and
    means for optically measuring the track pitch between two of said calibration tracks and for generating said offset signal in response to said measurement.

7. The track pitch calibration system of claim 6 further including storage means for storing said offset signal, whereby the track pitch of the calibration tracks is measured during an initialization or calibration mode of said optical storage system and said offset signal is thereafter readily available for positioning said second radiation beam relative to said first radiation beam.

8. The track pitch calibration system of claim 6 wherein said means for optically measuring the track pitch of said calibration tracks comprises a means for aligning a first spot configuration from a first set of radiation beams with respect to a first of said calibration tracks; and means for measuring the misalignment of a second spot configuration from a second set of radiation beams with respect to a second of said calibration tracks, said second set of radiation beams being spaced apart in a substantially fixed relationship from the first set of radiation beams for a given optical storage system;

whereby the track pitch between said first and second calibration tracks may be accurately measured regardless of variations that may exist in the relative spaced-apart position of the first and second sets of radiation beams.

9. The track pitch calibration system of claim 6 wherein said means for optically measuring the track pitch measures the track pitch between a center pair of calibration tracks located in the center of said set of calibration tracks, at least one additional calibration track being on either side of said center pair, whereby the offset signal generated in response to the track pitch measurement of said center pair of calibration tracks includes therein the optical effects of having adjacent tracks on both sides of said center pair of calibration tracks.

10. The track pitch calibration system of claim 9 wherein the offset signal is used to align the first and second radiation beams of said optical storage system when the first radiation beam is following a first previously written data track and the second radiation beam is to follow a second previously written data track adjacent the first data track, additional previously written data tracks being on either side of said first and second data tracks.

11. The track pitch calibration system of claim 6 wherein said means for optically measuring the track pitch measures the track pitch between an outer pair of calibration tracks located at an outer edge of said set of calibration tracks, at least one additional calibration track being on an inner side of said outer pair of calibration tracks, and no additional calibration tracks being on an outer side of said outer pair of calibration tracks, whereby the offset signal generated in response to the track pitch measurement of said outer pair of calibration tracks includes therein the optical effects of having an adjacent track on one side but not the other of said outer pair of calibration tracks.

12. The track pitch calibration system of claim 11 wherein the offset signal is used to align the first and second radiation beams of said optical storage system when the first radiation beam is following a first previously written data track and the second radiation beam is writing a new data track adjacent said first previously written data track.

13. A method of accurately measuring and maintaining track pitch in an optical storage system, said storage system including a record carrier upon which data tracks are optically written, said record carrier having at least one data track previously written thereon, and said storage system including means for having a first radiation beam follow a previously written data track, and means for positioning a second radiation beam a desired distance from the first radiation beam in response to a track pitch offset signal, said method comprising the steps of:

(a) placing a set of at least four calibration tracks on the record carrier having the prescribed track pitch therebetween;

(b) optically measuring the track pitch between a select pair of the calibration tracks; and (c) generating said track pitch offset signal as a function of the measurement made in step (b).

14. The method of claim 13 further including:

(d) storing the track pitch offset signal generated in step (c), whereby steps (b) and (c) need only be performed during an initialization or calibration mode of said optical storage system and said track pitch offset signal is thereafter readily available for positioning the second radiation beam the desired distance from the first radiation beam.

15. The method of claim 13 wherein the select pair of calibration tracks whose track pitch is measured in step (b) comprises an inner pair of tracks having additional tracks adjacent both sides thereof, the track pitch offset signal generated in step (c) thus having included therein the optical effects of having data tracks adjacent both sides of the select pair of calibration tracks.

16. The method of claim 13 wherein the select pair of calibration tracks whose track pitch is measured in step (b) comprises an outer pair of tracks having an additional track adjacent an inner side thereof but having no tracks adjacent on outer side thereof, the track pitch offset signal generated in step (c) thus having included therein the optical effects of having additional track adjacent one side but not the other side of the select pair of calibration tracks.

* * * * *